United States Patent
Van Dyke et al.

(10) Patent No.: US 8,631,261 B2
(45) Date of Patent: Jan. 14, 2014

(54) CONTEXT STATE MANAGEMENT FOR PROCESSOR FEATURE SETS

(75) Inventors: Don A. Van Dyke, Rescue, CA (US); Michael Mishaeli, Zichron Yakov (IL); Ittai Anati, Haifa (IL); Baiju V. Patel, Portland, OR (US); Will Deutsch, Folsom, CA (US); Rajesh Shah, Portland, OR (US); Gilbert Neiger, Portland, OR (US); James B. Crossland, Banks, OR (US); Chris J. Newburn, South Beloit, IL (US); Bryant E. Bigbee, Scottsdale, AZ (US); Muhammad Faisal Azeem, Hillsboro, OR (US); John L. Reid, Portland, OR (US); Dion Rodgers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/967,303

(22) Filed: Dec. 31, 2007

(65) Prior Publication Data
US 2013/0042093 A1    Feb. 14, 2013

(51) Int. Cl.
*G06F 1/32* (2006.01)
*G06F 9/44* (2006.01)

(52) U.S. Cl.
USPC ............................ 713/320; 712/228; 712/229

(58) Field of Classification Search
USPC .................... 713/320; 712/228, 229
See application file for complete search history.

(56) References Cited

U.S. PATENT DOCUMENTS

| | | | | |
|---|---|---|---|---|
| 5,682,531 | A * | 10/1997 | Nakamura | 718/108 |
| 6,408,325 | B1 * | 6/2002 | Shaylor | 718/108 |
| 7,010,674 | B2 * | 3/2006 | Tremblay et al. | 712/228 |
| 2007/0136733 | A1 * | 6/2007 | Park et al. | 718/108 |
| 2008/0133898 | A1 * | 6/2008 | Newburn et al. | 712/228 |
| 2009/0089562 | A1 * | 4/2009 | Schuchman et al. | 712/228 |

* cited by examiner

*Primary Examiner* — Vincent Tran
(74) *Attorney, Agent, or Firm* — Thomas R. Lane

(57) ABSTRACT

Embodiments of an invention related to context state management based on processor features are disclosed. In one embodiment, a processor includes instruction logic and state management logic. The instruction logic is to receive a state management instruction having a parameter to identify a subset of the features supported by the processor. The state management logic is to perform a state management operation specified by the state management instruction.

17 Claims, 2 Drawing Sheets

METHOD 200

CONTEXT STATE MANAGEMENT FOR PROCESSOR FEATURE SETS

FIELD

Embodiments of the invention relate to microprocessor architecture. More particularly, embodiments of the invention relate to managing context state information within a microprocessor.

BACKGROUND

Modern microprocessors may perform numerous functions requiring a change of context state. For example, a microprocessor may change context state information when switching between groups of instructions, such as software threads. In changing between software threads, for example, context state of one group of instructions may be saved to a memory location and the context state of another group of instructions may be restored from memory and loaded into the microprocessor.

In reference to software threads, "context state" may refer to a portion of each software thread's state that is to be maintained between context switches within a processor. Context state may be stored in processor architectural registers, control registers, or other storage areas, such as memory. Context state is typically represented by a number of bits, the values of which define a particular context state.

The term "context switch" typically refers to a change from one processor execution state to another, such as a software thread switch. A context switch is typically performed either by the operating system or by a user's program. For example, a context switch may occur as a result of calling a subroutine within a user's program, in which the calling program's context is saved in a storage area, such as a stack when the call to the subroutine occurs, and restored from the storage area when returning from the called subroutine.

Typically, context state is saved to memory or restored to processor registers in groups that may include more context state information that is needed at a given time, due to the organization of context state save areas in memory and the granularity with which these save areas are addressed. As a result, an unnecessarily large number of processor state information may be replaced each time context state is restored from memory. For example, an operating system or user program may only request a subset of context state information pertaining to a particular software thread or other process being performed within a processor. However, prior art context state save and restore mechanisms may require that all context state pertaining to a thread or other process be restored and/or saved in order to retrieve any context state information pertaining to the thread or process of interest.

Prior art context state management techniques may, therefore, result in performance and resource inefficiencies.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention pertain to microprocessor architecture. More particularly, embodiments of the invention pertain to managing processor context state. At least one embodiment of the invention introduces extended functionality to some prior art context state managing techniques in order to facilitate resource and performance efficiency when reading and updating context state information within a microprocessor.

An operating system ("OS") and/or user program typically uses an area ("save area") in a memory structure, such as dynamic random access memory ("DRAM"), for saving context state during a context switch. In other prior art systems, some software routines, such as exception handlers, may allocate the save area only as needed ("dynamically") in a memory storage area, such as a stack. Instruction set architectures typically define one or more instructions to handle the storage of context state to memory or the restoration of context state from memory. For example, in one embodiment of the invention, two instructions, ("XSAVE" and "XRSTOR") may be used to store context state to memory and restore context state from a memory to a processor's registers, respectively. In other instruction set architectures more or fewer than two instructions may be used to manage context state information.

Embodiments of the present invention provide an approach to selectively manage processor context state, where the selectivity is on a per feature basis. Embodiments provide for an approach that is independent of the feature set of a processor, therefore, it may be extended to new processor architectures.

Figure 1:
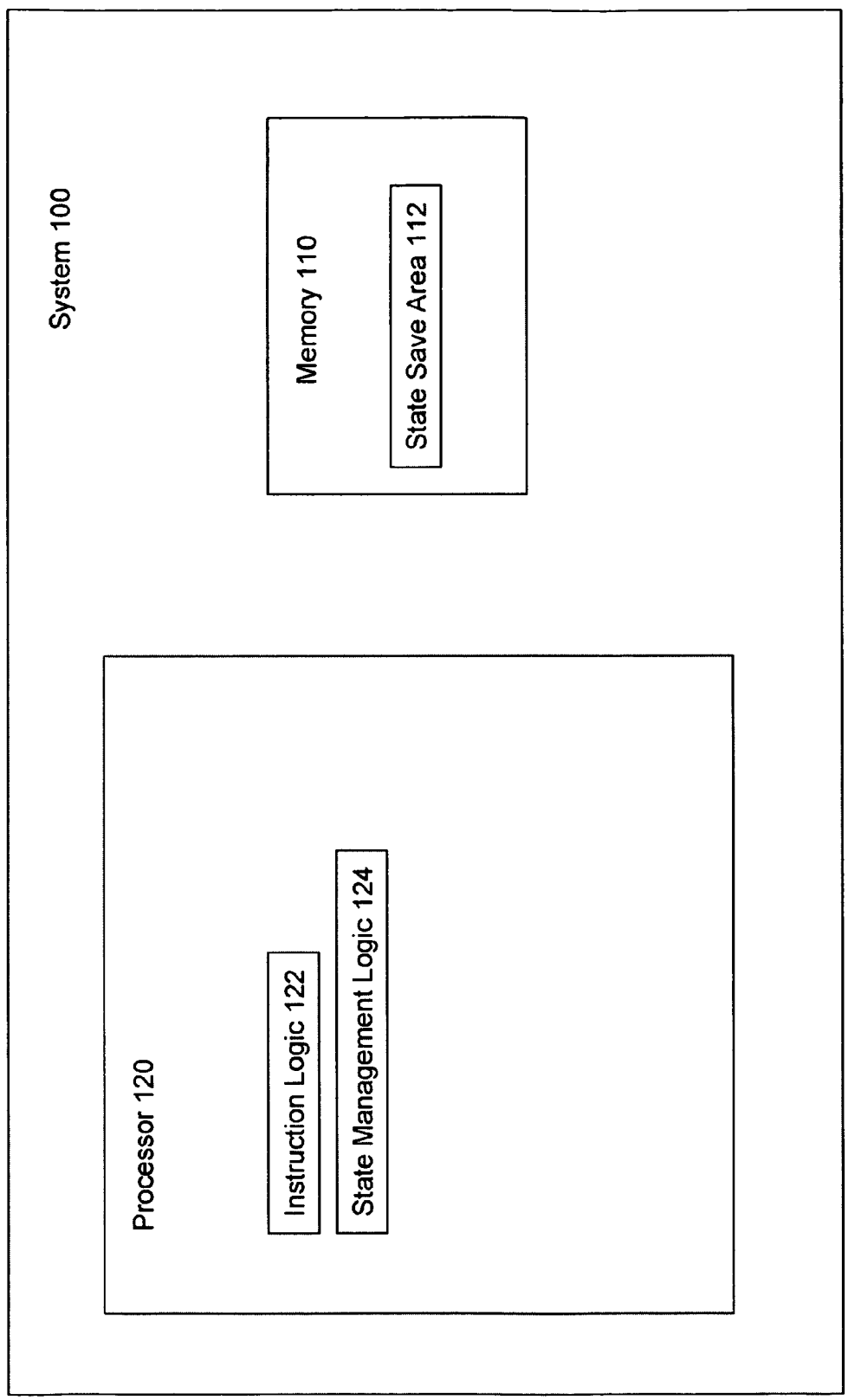
FIG. 1 illustrates a system, memory, and processor supporting context state management according to an embodiment of the present invention.

FIG. 1 illustrates system 100, including memory 110 and processor 120, according to an embodiment of the present invention. Memory 110 and processor 120 may be coupled to or communicate with each other within system 100 according to any known approach, such as directly or indirectly through one or more buses, point-to-point, or other wired or wireless connections. System 100 may also include any other components not shown in FIG. 1.

Memory 110 may be static or dynamic random access memory, flash memory, magnetic or optical disk memory, any other type of medium readable by processor 120, or any combination of such mediums. Memory 110 includes state save area 112 to save state of processor 120.

Processor 120 may be any type of processor, including a general purpose microprocessor, such as a processor in the Intel® Pentium® Processor Family, Itanium® Processor Family, or other processor family from Intel® Corporation, or another processor from another company, or a special purpose processor or microcontroller. Processor 120 may include multiple threads and multiple execution cores, in any combination. Processor 120 includes instruction logic 122 and state management logic 124. Processor 120 may also include any other circuitry, structures, or logic not shown in FIG. 1.

Instruction logic 122 is to receive instructions, including state management instructions. State management instructions may be any instructions to which the processor is designed to respond by performing state management operations, as described below. Instruction logic 122 may include any circuitry, logic, or other structure that recognizes, decodes, or otherwise receives instructions.

Stage management logic 124 is to perform state management operations, as described below. State management logic 124 may include any circuitry, logic, or other structures to perform the state management operations. For example, state management logic 124 may include microcode, state machine logic, programmable logic, or any other form of control logic to cause processor 120 to respond appropriately to state management instructions. To do so, state management logic 124 may refer to any form of hardware, software, or firmware, such as a processor abstraction layer, within processor 120 or within any device accessible or medium readable by processor 120, such as memory 110.

Also, state management logic may include logic and datapaths to read, write, and move state information into, from, and between registers and other storage locations where state information may be stored for internal use and/or to be read by software running on processor 120, and logic to perform masking and other logical operations on bit vectors or other representations of state information. State management logic 124 may be dedicated to state management or may by used, in whole, in part, and/or together with other logic, to perform other functions, operations, instructions, etc. in processor 120.

State management logic 124 may determine what operation to perform and how to perform the operation based on information provided by the instruction, associated with the instruction, and/or related to other information accessible by state management logic 124. Any known approach to conveying this information from software to state management logic 124 may be used within the scope of the present invention, such as any combination of different instructions, different instruction formats, different operand types and locations, etc. For example, state management instructions may include a field holding the information, the name of a register holding the information, and/or an address of a memory location holding the information. According to any of these approaches, or any other known approach, the information may be referred to as a "parameter" of the instruction.

Figure 2:
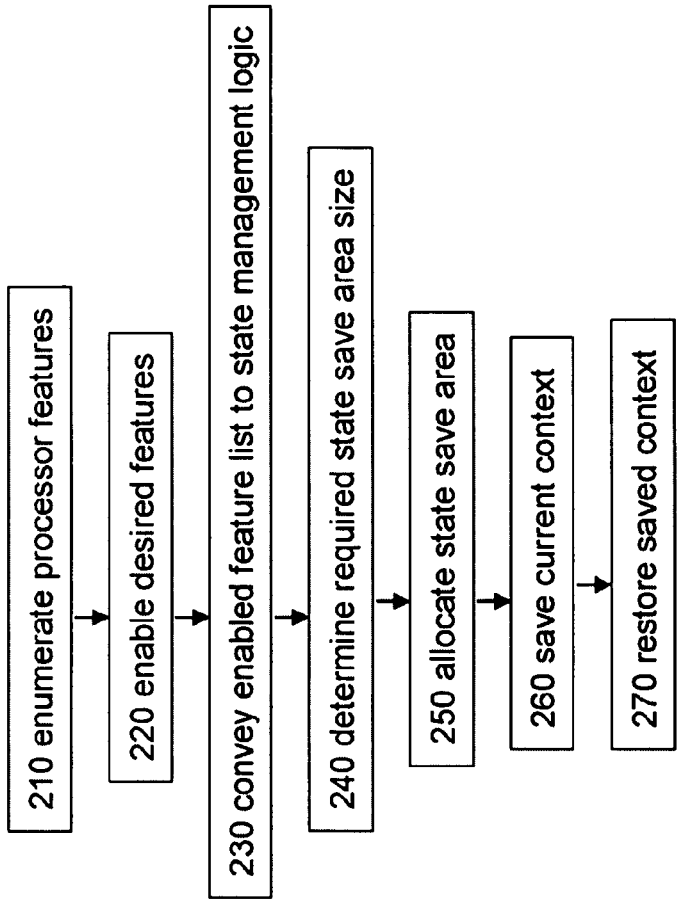
FIG. 2 illustrates a method for context state management according to an embodiment of the present invention.

State management logic 124 may operate based on signals from instruction logic 122, and/or based on any parameters associated with a state management instruction, to cause processor 120 to execute portions of method embodiments of the present invention, such as method 200 and 300, as illustrated in FIG. 2. For example, control logic 124 may cause processor 120 to execute portions of method embodiments of the present invention by executing one or more micro-instructions or micro-operations in response to receiving a state management instruction.

FIG. 2 illustrates method 200 for processor state management according to an embodiment of the present invention. Although method embodiments of the invention are not limited in this respect, reference may be made to elements of system 100 to describe the method embodiment of FIG. 2. Method 200 refers to state management instructions by names that may be used according to one embodiment; in other embodiments, these instructions or similar instructions may have different names.

In box 210 of method 200, a processor is queried, e.g., by an OS issuing a processor identification ("CPUID") instruction with an appropriate request type and/or other parameters, to enumerate the features supported by the processor. In box 220, the OS or other privileged software enables a subset of those features.

In box 230, the OS issues an instruction ("XSETBV") to convey to the state management logic the subset of the features that are enabled. In one embodiment, XSETBV has a parameter to program a bit vector ("XFEATURE_ENABLED_MASK") to indicate which features are enabled, e.g., using one bit per feature that has a manageable state. A corresponding instruction ("XGETBV") may be used by software to read XFEATURE_ENABLED_MASK.

The XSETBV and XGETBV instructions also may have a parameter to allow them to be used to program and read, respectively, two other bit vectors. One of these bit vectors indicates which features are currently in use, i.e., their state values might have changed since initialization. The other of these bit vectors indicates which features are currently modified, i.e., their state values might have changed since the last their state was last restored. XSETBV may be a privileged instruction and XBVGET may be a non-privileged instruction.

In box 240, the processor is queried, e.g., by an OS issuing CPUID with an appropriate request type and/or other parameters, to determine the size required for the state save area, based on the enabled features. A CPUID instruction may also be used to determine the size required for the state save area if all features are enabled. Another instruction ("XSIZE") may be used, with a bit vector indicating a subset of features as a parameter, to determine the size required for that subset.

In box 250, the OS may allocate a portion of memory for the state save area. In box 260, the OS may issue an instruction ("XSAVE") to save the current context. In box 270, the OS may issue an instruction ("XRSTOR") to restore a saved context. Upon execution of XRSTOR, all state may be marked as unmodified.

XSAVE and XRSTOR may have a parameter that provide for selectively controlling the saving and restoring of state. The parameter may be a bit vector, with one bit per feature, to select the features for which state should be saved or restored. This bit vector may be combined with XFEATURE_ENABLED_MASK (e.g., with a logical AND operation) by state management logic, such that state is saved or restored only for those features that are both selected and enabled.

Within the scope of the present invention, the method illustrated in FIG. 2 may be performed in a different order, with illustrated boxes omitted, with additional boxes added, or with a combination of reordered, omitted, or additional boxes. Many variations of method 200 and many other methods are possible within the scope of the present invention. Some of these variations or other methods may be based on the following descriptions that may be included in other embodiments of the present invention.

Another save instruction ("XSAVEOPT") may be used to provide for more optimal state management. XSAVEOPT may be architecturally compatible with XSAVE, in that XRSTOR may be used with either. In one embodiment, XSAVEOPT may be used by an OS and XSAVE by other software. XSAVEOPT may, implicitly or by using a parameter, specify that only the state for the features with currently in-use state should be saved, or, that only the state for features with currently modified state should be saved. To facilitate operation of XSAVEOPT, an identifier for XRSTOR, e.g., the save area address, may be recorded in the processor (not readable by software). Then, all state corresponding to the logical AND of XFEATURE_ENABLED_MASK and the in-use mask or the modified mask from the save area header may restored.

A header in the save area records may indicate whether each component of the state is valid in the save image. A value of "1" in the header may indicate that the data associated with that bit in the save image is valid (e.g., data has been saved there). A value of "0" in the header may indicate that the state associated with that bit is in its initialized form and the memory area corresponding to the bit may not contain the initialized value of that state. Execution of XRSTOR may refer to this header to properly initialize state for which the save image is not valid.

All state may be marked as modified based on an indication of a context switch (e.g., a change to a page table pointer register), a transfer of control to or from a virtual machine, or when a feature set is changed.

An optional parameter to XSAVE and XRSTOR may specify that the state save area for features that are not to be saved or restored should be compacted out.

An instruction ("XOFFSET") may be used to determine the location of a given feature's state within a save image. XOFFSET may have a parameter (e.g., a bit vector) to indicate the features saved by the last save to that image, and another parameter (e.g., an index into the bit vector) to identify the given feature.

Embodiments of the present invention provide for extensibility to new feature sets. New features may be appended to currently-defined state. New features may get an additional element in a feature bit vector in the header. The position of a feature in the feature bit vector does not imply an ordering in the state save area.

Processor 100, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, embodiments of an invention related to context state management based on processor features have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   instruction logic to receive a first state management instruction, a second state management instruction, and a third state management instruction, the first state management instruction having a parameter to program a bit vector to identify a subset of a plurality of features supported by the processor, the second state management instruction to read the bit vector, and the third state management instruction to specify a state management operation; and
   state management logic to perform the state management operation specified by the third state management instruction for the subset of the plurality of features.

2. The processor of claim 1, wherein the parameter indicates the features that are enabled.

3. The processor of claim 1, wherein the parameter indicates the features that are selected for state management.

4. The processor of claim 1, wherein the state management operation is to save a context.

5. The processor of claim 4, wherein the state management operation is to save only in-use state.

6. The processor of claim 4, wherein the state management operation is to save only modified state.

7. The processor of claim 1, wherein the state management operation is to restore a context.

8. The processor of claim 7, wherein the state management operation is to restore only valid state.

9. A method comprising:
   receiving, by a processor, a first state management instruction having a parameter to program a bit vector to identify a subset of a plurality of features supported by the processor;
   receiving, by the processor, a second state management instruction to read the bit vector;
   receiving, by the processor, a third state management instruction to specify a state management operation; and
   performing, by the processor, the state management operation specified by the third state management instruction for the subset of the plurality of features.

10. The method of claim 9, wherein the state management operation is to save a context.

11. The method of claim 10, wherein the state management logic is to save only in-use state.

12. The method of claim 10, wherein the state management logic is to save only modified state.

13. The method of claim 9, where in the state management operation is to restore a context.

14. The method of claim 13, wherein the state management operation is to restore only valid state.

15. The method of claim 9, wherein the parameter indicates the features that are enabled.

16. The method of claim 9, wherein the parameter indicates the features that are selected for state management.

17. A system comprising:
   a memory to store state; and
   a processor including:
      instruction logic to receive a first state management instruction, a second state management instruction, and a third state management instruction, the first state management instruction having a parameter to program a bit vector to identify a subset of a plurality of features supported by the processor, the second state management instruction to read the bit vector, and the third state management instruction to specify a state management operation, wherein to state management operation is one of a first operation to save state to the memory and a second operation to restore state from the memory; and state management logic to perform the third state management operation for the subset of the plurality of features.

* * * * *